United States Patent
Nakayama et al.

(10) Patent No.: US 11,732,169 B2
(45) Date of Patent: Aug. 22, 2023

(54) SILICONE ADHESIVE COMPOSITION, ADHESIVE TAPE, ADHESIVE SHEET AND DOUBLE-SIDED ADHESIVE SHEET

(71) Applicant: Shin-Etsu Chemical Co., Ltd., Tokyo (JP)

(72) Inventors: Ken Nakayama, Gunma (JP); Yasuyoshi Kuroda, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 506 days.

(21) Appl. No.: 16/760,023

(22) PCT Filed: Oct. 15, 2018

(86) PCT No.: PCT/JP2018/038351
§ 371 (c)(1),
(2) Date: Apr. 29, 2020

(87) PCT Pub. No.: WO2019/087759
PCT Pub. Date: May 9, 2019

(65) Prior Publication Data
US 2021/0024797 A1    Jan. 28, 2021

(30) Foreign Application Priority Data
Nov. 2, 2017 (JP) ................. 2017-212580

(51) Int. Cl.
| | | |
|---|---|---|
| *C09J 183/04* | (2006.01) | |
| *C09J 7/40* | (2018.01) | |
| *C09J 7/38* | (2018.01) | |
| *C09J 11/06* | (2006.01) | |
| *C09J 183/06* | (2006.01) | |
| *C09J 7/30* | (2018.01) | |
| *C09J 7/10* | (2018.01) | |
| *C08L 83/04* | (2006.01) | |
| *C08G 77/16* | (2006.01) | |
| *C08G 77/18* | (2006.01) | |

(52) U.S. Cl.
CPC ............ *C09J 183/04* (2013.01); *C09J 7/10* (2018.01); *C09J 7/30* (2018.01); *C09J 7/38* (2018.01); *C09J 7/40* (2018.01); *C09J 7/401* (2018.01); *C09J 11/06* (2013.01); *C09J 183/06* (2013.01); *C08G 77/16* (2013.01); *C08G 77/18* (2013.01); *C09J 2203/326* (2013.01); *C09J 2483/005* (2013.01)

(58) Field of Classification Search
CPC .................. C08L 83/04; C08L 83/06
See application file for complete search history.

(56) References Cited

U.S. PATENT DOCUMENTS

| | | | | |
|---|---|---|---|---|
| 5,696,209 | A * | 12/1997 | King ............... | C09J 183/04 528/21 |
| 6,387,487 | B1 * | 5/2002 | Greenberg ....... | C09J 183/04 428/355 R |
| 2010/0285312 | A1 * | 11/2010 | Mizuno ............ | C08L 83/00 428/355 R |
| 2010/0323145 | A1 | 12/2010 | Aoki | |
| 2012/0040180 | A1 | 2/2012 | Husemann et al. | |
| 2012/0045635 | A1 | 2/2012 | Aoki | |
| 2012/0328863 | A1 | 12/2012 | Kuo | |
| 2015/0147510 | A1 | 5/2015 | Saito | |
| 2018/0086915 | A1 | 3/2018 | Tsuchida | |
| 2019/0292417 | A1 * | 9/2019 | Nakayama ....... | C08G 77/14 |
| 2020/0277492 | A1 * | 9/2020 | Fukui .............. | H01L 21/6836 |

FOREIGN PATENT DOCUMENTS

| | | |
|---|---|---|
| JP | 07-018185 A | 1/1995 |
| JP | 2002363523 A | 12/2002 |
| JP | 2012-041505 A | 3/2012 |
| JP | 2013091785 A | 5/2013 |
| JP | 2013173944 A | 9/2013 |
| JP | 2016180021 A1 | 6/2016 |
| JP | 2016182772 A | 10/2016 |
| WO | 2010100024 A1 | 9/2010 |
| WO | 2015151221 A1 | 10/2015 |
| WO | WO 2018/012296 * | 1/2018 |

OTHER PUBLICATIONS

Machine translation of KR 101763368 into English (no date).*
Machine translation of JP 07-053941 into English (no date).*
EP Search Report for Application No. 18873535.1 dated Jul. 13, 2021.
International Search Report for International Application No. PCT/JP2018/038351, dated Nov. 13, 2018.

* cited by examiner

*Primary Examiner* — Marc S Zimmer
(74) *Attorney, Agent, or Firm* — Rimon, P.C.

(57) ABSTRACT

Provided is a silicone adhesive composition having (A) a condensation product of a linear or branched diorganopolysiloxane having a silicon atom-bonded hydroxy group and/or a silicon atom-bonded alkoxy group having 1 to 10 carbon atoms at a terminal and having no alkenyl group, a linear or branched diorganopolysiloxane having at least two alkenyl groups, and an organopolysiloxane comprising an $R^1{}_3SiO_{0.5}$ unit and an $SiO_2$ unit and having a silicon atom-bonded hydroxy group and/or a silicon atom-bonded alkoxy group having 1 to 6 carbon atoms, (B) an organohydrogenpolysiloxane having at least three SiH groups and an average polymerization degree of 80 or less in an amount of 0.1 to 5 parts by mass, relative to 100 parts by mass of component (A), and (C) a platinum group metal catalyst in a catalytic amount.

12 Claims, No Drawings

United States Patent 11,732,169 B2

SILICONE ADHESIVE COMPOSITION, ADHESIVE TAPE, ADHESIVE SHEET AND DOUBLE-SIDED ADHESIVE SHEET

CROSS REFERENECE TO RELATED APPLICATIONS

The present application is a National Stage application of and claims priority to PCT application PCT/JP2018/038351 filed Oct. 15, 2018, which claims priority to Japanese Application No. 2017-212580 filed Nov. 2, 2017, the contents of the above application are incorporated by reference herein in their entireties.

TECHNICAL FIELD

The present invention relates to a silicone adhesive composition, specifically, a silicone adhesive composition suitable for an adhesive tape, an adhesive sheet and a double-sided adhesive sheet.

BACKGROUND OF THE INVENTION

A polysiloxane comprised in a silicone adhesive has a main chain composed of Si—O bonds which have a high bonding energy. Therefore, the polysiloxane has excellent heat resistance, cold resistance, weather resistance, an electric insulation property and chemical resistance. The silicone adhesive has excellent wettability to various adherends and has good adhesiveness to a silicone resin, a polyolefin, a fluorine resin, a silicone rubber and a silicone release paper to which an organic resin-based adhesive such as an acrylic or rubber adhesive is less adhesive.

In the preparaiton of an adhesive tape having a silicone adhesive, the silicone adhesive is applied on a substrate, such as a plastic film, and cured in order to improve the adhesive property. Such an adhesive tape includes a heat-resistant adhesive tape, a heat-resistant masking tape, a chemical-resistant masking tape, an electrical insulation tape, a silicone rubber-fixing tape and a splicing tape for connecting silicone release paper with each other. These are prepared by applying the silicone adhesive on a heat-resistant substrate.

When an electronic device, an electrical appliance and other devices and appliances are assembled, heat resistance, cold resistance, and adhesiveness to a silicone-based material may be required. Therefore, a double-sided adhesive tape having a silicone adhesive is useful.

In recent years in particular, double-sided adhesive tapes are used also for members for various optical applications, such as touch panels, display members, organic electroluminescence devices. Patent Literature 1 describes a double-sided adhesive tape having a silicone adhesive applied on both sides of a plastic film substrate. However, this double-sided adhesive tape has a large total thickness, which is inconvenient for miniaturization, thinning, weight reduction and visibility of equipments. Accordingly, a double-sided adhesive sheet having no substrate, particularly for an optical adhesive sheet (OCA: Optical Clear Adhesive), is required.

Recently, a major material for OCA is an acrylic adhesive. Patent Literatures 2, 3 and 4 disclose that adhesives having various characteristics are produced by changing a type and a composition ratio of acrylic monomers as a raw material, and such adhesives have excellent adhesiveness to various adherends. However, an acrylic adhesive has problems that it tends to because less transparent and yellowing at a high temperature, and its elastic modulus changes with temperature change so that it disengages from an adherend, compared to a silicone adhesive. Therefore, a silicone adhesive is recently used for an OCA (Patent Literatures 5, 6, and 7). The silicone adhesive offers small elastic modulus, good weather resistance and stability and, further, impact resistance is improved because of its flexibility. In addition, a silicone has a lower refractive index than an acryl resin and, thereby, the visibility will be further improved.

A known OCA with an silicone adhesive is, for example, a laminate wherein a silicone adhesive layer is sandwiched between two release liners coated with a fluorine-containing silicone release agent. When this laminate is used, one of the release liners is peeled off, the naked surface of a silicone adhesive layer is sticked to a desired position of an object and the other release liner is peeled off and, then, the other surface of the adhesive layer is sticked to another object. For example, Patent Literature 5 and 6 describe that use of a specific fluorine-containing silicone release composition improves a release property of two release liners in an OCA. Patent Literature 7 describes that adhesion of a touch panel is improved by a specific silicone adhesive composition.

PRIOR ART LITERATURES

Patent Literatures

[Patent Literature 1] WO2015/151221
[Patent Literature 2] Japanese Patent Application Laid-Open No.2002-363523
[Patent Literature 3] Japanese Patent Application Laid-Open No.2013-091785
[Patent Literature 4] Japanese Patent Application Laid-Open No.2016-180021
[Patent Literature 5] Japanese Patent Application Laid-Open No.2013-173944
[Patent Literature 6] Japanese Patent Application Laid-Open No.2016-182772
[Patent Literature 7] WO2010/100024

SUMMARY OF THE INVENTION

Problems to be Solved by the Invention

However, the silicone adhesives described in Patent Literatures 5 and 6 are not suitable for permanent adhesion because their adhesive strength is low. The silicone adhesive of Patent Literature 7 does not have sufficient adhesive force. Patent Literature 7 does not refer to a peeling force from the peeling film. As described above, the adhesiveness of the conventional silicone adhesives for the OCA is lower than that of the acrylic adhesive. When their compositions are changed to have increased adhesiveness. It is difficult to peel it off from a release liner. Adhesiveness of an adhesive may varies, depending on a peeling speed. Permanent adhesive force which is not affected by a peeling speed is required in the application of the OCA.

The present invention has been made in view of the above circumstances. One of the purposes of the present invention is to provide a solicone adhesive composition which is easily peeled off from a release liner and shows strong adhesion independently of a peeling speed. Further, another purpose is to provide an adhesive tape and sheet having a cured product of the composition, and a double-sided adhesive sheet having a cured product of the composition.

Means to Solve the Problems

As a result of intensive studies to solve the above-mentioned problems, the inventors have found that the aforesaid problems are solved by a silicone adhesive composition comprising a condensation product of a specific diorganopolysiloxane having a hydroxy group and/or an alkoxy group with an organopolysiloxane having an $R^1{}_3SiO_{0.5}$ unit and an $SiO_2$ unit and having a hydroxy group and/or an alkoxy group in a specific weight ratio, and an organohydrogenpolysiloxane having an average degree of polymerization of 80 or less.

That is, the present invention provides a silicone adhesive composition comprising the following components (A) to (C),
(A) a condensation product of the following components (a1), (b) and (a2) or a mixture of a condensation product of the following components (a1) and (b), and the following component (a2), wherein a mass ratio of component (a1) to component (a2) is 100/0 to 45/55, and an amount of the component (b) is 75 to 40 parts by mass, relative to total 100 parts by mass of components (a1), (a2) and (b), (a1) a linear or branched diorganopolysiloxane having a silicon atom-bonded hydroxy group and/or a silicon atom-bonded alkoxy group having 1 to 10 carbon atoms at a terminal and having no alkenyl group, (a2) a linear or branched diorganopolysiloxane having at least two alkenyl groups in an amount of from 0.0005 mol/100 g to less than 0.15 mol/100 g and, optionally, a silicon atom-bonded hydroxy group or a silicon atom-bonded alkoxy group having 1 to 10 carbon atoms, (b) an organopolysiloxane comprising an $R^1{}_3SiO_{0.5}$ unit and an $SiO_2$ unit and having a silicon atom-bonded hydroxy group and/or a silicon atom-bonded alkoxy group having 1 to 6 carbon atoms, wherein a molar ratio of the $R^1{}_3SiO_{0.5}$ unit to the $SiO_2$ unit is 0.5 to 1.5, wherein $R^1$ is, independently of each other, a substituted or unsubstituted monovalent hydrocarbon group having 1 to 10 carbon atoms, (B) an organohydrogenpolysiloxane having at least three SiH groups and an average polymerization degree of 80 or less in an amount of 0.1 to 5 parts by mass, relative to 100 parts by mass of component (A), and (C) a platinum group metal catalyst in a catalytic amount.

The present invention further provides an adhesive tape or sheet which has a layer of a cured product of the aforesaid silicone adhesive composition, and a double-sided adhesive sheet having a cured product of the silicone adhesive composition.

Effects of the Invention

The cured product of the adhesive composition of the present invention has a high adhesive force, independently of a peeling speed, so that an adherend is strongly bonded or fixed by the cured product. Further, the cured product of the present adhesive composition has excellent release properties to a release liner composed of a fluorine-containing silicone release composition, and provides an adhesive tape, an adhesive sheet and a double-sided adhesive sheet having no substrate, which are excellent in release properties and adhesion strength.

DETAILED DESCRIPTION OF THE INVENTION

The silicone adhesive composition of the present invention will be described below in detail.
Component (A)

In the silicone adhesive composition of the present invention, component (A) is a condensation reaction product of a diorganopolysiloxane having a hydroxy group and/or an alkoxy group with an organopolysiloxane having a hydroxy group and/or an alkoxy group and having a M unit and a Q unit. Specifically, component (A) is a condensation product of component (a1), component (b), and component (a2) or a mixture of a condensation product of component (a1) with component (b), and component (a2). The mass ratio of component (a1) to component (a2) is 100/0 to 45/55 and the amount of component (b) is 75 to 40 parts by mass, relative to total 100 parts by mass of components (a1), (a2) and (b).

(a1) A linear or branched diorganopolysiloxane having a silicon atom-bonded hydroxy group and/or a silicon atom-bonded alkoxy group having 1 to 10 carbon atoms at a terminal and having no alkenyl group.

(a2) A linear or branched diorganopolysiloxane having at least two alkenyl groups in an amount of from 0.0005 mol/100 g to less than 0.15 mol/100 g and, optionally, a silicon atom-bonded hydroxy group or a silicon atom-bonded alkoxy group having 1 to 10 carbon atoms.

(b) An organopolysiloxane comprising an $R^1{}_3SiO_{0.5}$ unit and an $SiO_2$ unit and having a silicon atom-bonded hydroxy group and/or a silicon atom-bonded alkoxy group having 1 to 6 carbon atoms, a molar ratio of the $R^1{}_3SiO_{0.5}$ unit to the $SiO_2$ unit is 0.5 to 1.5, wherein $R^1$ is, independently of each other, a substituted or unsubstituted monovalent hydrocarbon group having 1 to 10 carbon atoms.

Component (a1) is a linear or branched diorganopolysiloxane having a silicon atom-bonded hydroxy group and/or a silicon atom-bonded alkoxy group having 1 to 10 carbon atoms at the terminal and having no alkenyl group. For example, component (A) is represented by the following formula (1).

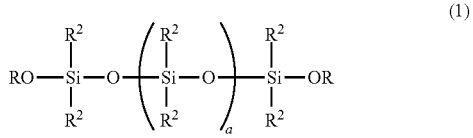

(1)

wherein R is a hydrogen atom or a monovalent hydrocarbon group having 1 to 10 carbon atoms, $R^2$ is, independently of each other, a substituted or unsubstituted monovalent hydrocarbon group having 1 to 10 carbon atoms and has no aliphatic unsaturated bond, and a is an integer of 100 to 20,000. Component (a1) may be used singly or in combination of two or more of them.

$R^2$ is preferably an alkyl group having 1 to 6 carbon atoms, a cycloalkyl group having 5 to 8 carbon atoms, an aryl group having 6 to 10 carbon atoms, and an aralkyl group having 7 to 10 carbon atoms. More specifically, examples of $R^2$ include alkyl group such as a methyl group, an ethyl group, a propyl group and a butyl group, cycloalkyl groups such as a cyclohexyl group, aryl groups such as a phenyl group and a tolyl group and aralkyl groups such as a benzyl group, and those in which a part or all of the hydrogen atoms bonded to a carbon atom are substituted with a hydroxy group, a cyano group, a halogen atom, an alkoxysilyl group, a polyoxyalkylene group, an epoxy group, or a carboxyl group. Among these, a methyl group and a phenyl group as preferable, and a methyl group is particularly preferable.

When component (a1) represented by the formula (1) has an aryl group as $R^2$, the ratio of the number of the aryl group to the total number of groups each bonded to a silicon atom in the component (a1) is preferably 0.1 to 30%. If the amount of the aryl group is larger than 30%, the adhesiveness of the obtained silicone adhesive layer may be lower or transparency of the layer may be poor. The aryl group is such bonded to a silicon atom and such of an aralkyl group bonded to a silicon atom. The aryl group of the aralkyl group bonded to a silicon atom is, for example, a phenyl group of a benzyl group (phenylmethyl group) and a phenyl group of a phenethyl group (phenylethyl group).

In the formula (1), "a" is an integer of 100 to 20,000, preferably 150 to 15,000.

The diorganopolysiloxane (a1) may be in a form of oil or raw rubber. When the diorganopolysiloxane (a1) is an oil at 25 degrees C., component (a1) preferably has a viscosity at 25 degrees C. of 300 to 1,000,000 mPa·s, particularly 1,000 to 800,000 mPa·s. When the diorganopolysiloxane (a1) is a raw rubber, a viscosity of a 30% by mass solution of diorganopolysiloxane (a1) in toluene is preferably 1,000 to 200,000 mPa·s, particularly preferably 3,000 to 100,000 mPa·s. If the viscosity is less than the aforesaid lower limit, it may be difficult to uniformly apply the obtained silicone adhesive composition. If the viscosity is larger than the aforesaid upper limit, the viscosity of the silicone adhesive composition is too high and, therefore, stirring may be difficult at the time of preparing the composition. In the present specification, the viscosity is determined at 25 degrees C. by a BM type rotary viscometer.

R is a hydrogen atom or a hydrocarbon group having 1 to 10 carbon atoms. Examples of the hydrocarbon group include an alkyl group having 1 to 10 carbon atoms, a cycloalkyl group having 5 to 10 carbon atoms, an aryl group having 6 to 10 carbon atoms, and an aralkyl group having 6 to 10 carbon atoms. R is preferably a hydrogen atom, a methyl group and an ethyl group, more preferably a hydrogen atom.

The amounts of the SiOH group and the alkoxysilyl group in component (a1) are preferably 0.001 to 0.45 mass %, particularly 0.003 to 0.40 mass %, relative to component (a1). The amounts of the SiOH group and the alkoxysilyl group may be determined generally by a known method such as a Grignard method or an NMR method, hereinafter the same.

Specifically, component (a1) may be those represented by the following formulas, but is not limited to those. In the following formulas, Me is a methyl group and Ph is a phenyl group. The order of bonding of the siloxane units in the parentheses is not limited, and may be at random or such as to form a block structure.

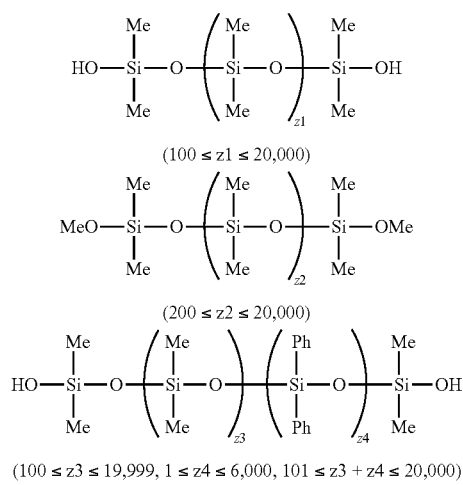

Component (a2) is a linear or branched diorganopolysiloxane having two or more alkenyl groups in one molecule. The diorganopolysiloxane may have a hydroxy group or an alkoxyl group having 1 to 10 carbon atoms. For example, component (a2) is represented by the following formula (3) or (4). Component (a2) may be used singly or in combination of two or more of them.

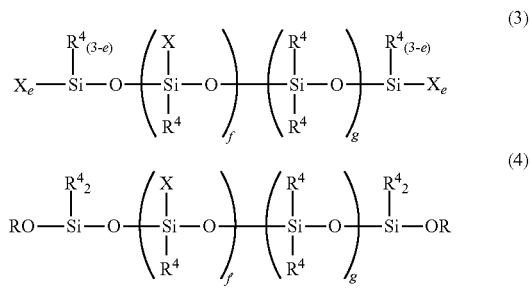

wherein $R^4$ is, independently of each other, a substituted or unsubstituted monovalent hydrocarbon group having 1 to 10 carbon atoms and has no aliphatic unsaturated bond, X is a monovalent organic group having an alkenyl group or an alkenyl group. R is a hydrogen atom or a hydrocarbon group having 1 to 10 carbon atoms. e is an integer from 0 to 3, f is an integer of 0 or larger, f' is an integer of 2 or larger, g is an integer of 100 or larger, $2e+f \geq 2$, $100 \leq f+g \leq 20,000$ and $102 \leq f'+g \leq 20,000$. The order of bonding of the siloxane units in the parentheses is not limited, and may be at random or form a block structure.

In formulas (3) and (4), $R^4$ is preferably an alkyl group having 1 to 6 carbon atoms, a cycloalkyl group having 5 to 8 carbon atoms, an aryl group having 6 to 10 carbon atoms, or an aralkyl group having 7 to 10 carbon atoms. More specifically, examples of $R^4$ include alkyl groups such as a methyl group, an ethyl group, a propyl group or a butyl group, a cycloalkyl group such as a cyclohexyl group, an aryl group such as a phenyl group and a tolyl group, and aralkyl groups such as a benzyl group, and those in which a part or all of the hydrogen atoms bonded to a carbon atom are substituted with a hydroxy group, a cyano group, a halogen atom, an alkoxysilyl group, a polyoxyalkylene group, an epoxy group, and a carboxyl group. Among these, a methyl group and a phenyl group are preferable, and a methyl group is particularly preferable.

When component (a2) represented by the formula (3) or (4) has an aryl group as $R^4$, the ratio of the number of the aryl group to the total number of groups each bonded to a silicon atom in component (a2) is preferably 0.1 to 30%. If the amount of the aryl group is larger than 30%, the adhesiveness of the obtained silicone adhesive layer may be lower or transparency of the layer may be poor. The aryl group is such bonded to a silicon atom and such of an aralkyl group bonded to a silicon atom. The aryl group of the aralkyl group bonded to a silicon atom is, for example, a phenyl group of a benzyl group (phenylmethyl group) and a phenyl group of a phenethyl group (phenylethyl group).

X is an alkenyl group or a monovalent organic group having an alkenyl group. Preferably, X is a monovalent hydrocarbon group having an alkenyl group or an alkenyl group having 2 to 10 carbon atoms, more preferably 2 to 8 carbon atoms, and the monovalent hydrocarbon group may have an oxygen atom. Examples of the alkenyl group include a vinyl group, an allyl group, a hexenyl group and an octenyl group. Examples of the monovalent hydrocarbon group having an alkenyl group include a cycloalkenylalkyl group such as a cyclohexenylethyl group. Alkenyl group-containing monovalent hydrocarbon groups that may have an oxygen atom include (meth)acryloylalkyl groups such as an acryloylpropyl, acryloylmethyl and methacryloylpropyl groups. They may also have an ether bond such as —(CH$_2$)$_2$—O—CH$_2$—CH═CH$_2$ and —(CH$_2$)$_3$—O—CH$_2$—CH═CH$_2$.

The amount of alkenyl groups contained in component (a2) is preferably 0.0005 mol or more to less than 0.15 mol, more preferably 0.0006 to 0.13 mol, and even more preferably 0.008 to 0.10 mol, relative to 100 g of component (a2). If the amount is less than the aforesaid lower limit, the curability may be deteriorated. If the amount is less than 0.15 mol, the obtained adhesive layer is not hard and an appropriate adhesive strength is obtained. The amount of the alkenyl group is determined generally by any known method such as an iodination method such as Hanus method or an NMR method, hereinafter the same.

In formulas (3) and (4), e is an integer of 0 to 3, preferably 0 or 1. f is an integer 0 or more, preferably an integer of 0 to 3,000. f' is an integer of 2 or more, preferably an integer of 2 to 3,000. g is an integer of 100 or more, preferably 150 to 20,000, and 2e+f≥2, preferably 2≤2e+f≤3,000, 100≤f+g≤20,000, preferably 150≤f+g≤15,000, 102≤f'+g≤20,000, preferably 150≤e'+f≤15,000.

Component (a2) may be in a form of oil or raw rubber. When component (a2) is oil at 25 degrees C., component (a2) preferably has a viscosity at 25 degrees C. of 1,000 to 1,000,000 mPa·s, particularly 5,000 to 800,000 mPa·s. When the diorganopolysiloxane (a2) is a raw rubber, a viscosity of 30% by mass solution of the diorganopolysiloxane (a2) in toluene is preferably 1,000 to 200,000 mPa·s, particularly preferably 3,000 to 100,000 mPa·s. If the viscosity is less than the aforesaid lower limit, it may be difficult to uniformly apply the obtained silicone adhesive composition. If the viscosity is larger than the aforesaid upper limit, the viscosity of the silicone adhesive composition is too high and, therefore, stirring may be difficult at the time of preparing the composition.

R is a hydrocarbon group having 1 to 10 carbon atoms as described above. Among these, a hydrogen atom, a methyl group and an ethyl group are preferable and a hydrogen atom is more preferably.

As described above, component (a2) may have a hydroxy group or an alkoxyl group having 1 to 10 carbon atoms. The total amount of the hydroxy group and the alkoxy group contained in component (a2) is preferably 0 to 0.45 mass %, especially 0 to 0.40 mass %, based on the mass of component (a2). The method of determining the amounts of the hydroxy group and the alkoxy group is as described above. Particularly, component (a2) is preferably a diorganopolysiloxane having no hydroxy group or alkoxyl group having 1 to 10 carbon atoms, and is a compound represented by the aforesaid formula (3).

Specifically, component (a2) may be those represented by the following formulas, but is not limited to those. In the following formulas, Me is a methyl group, Vi is a vinyl group and Ph is a phenyl group. The order of bonding of the siloxane units in the parentheses is not limited, and may be at random or such as to form a block structure.

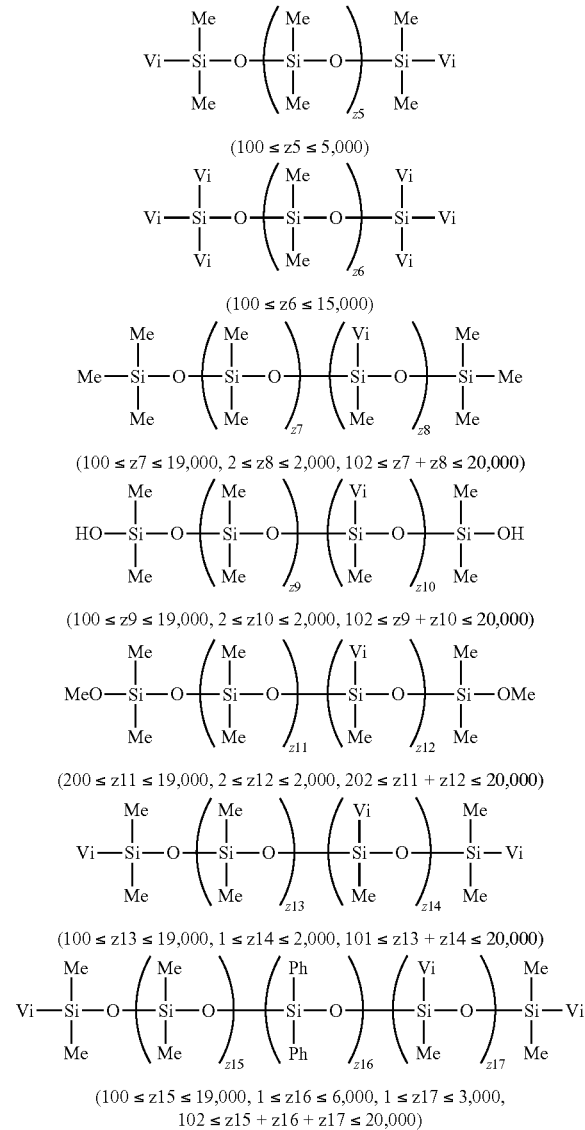

(b) Organopolysiloxane

Component (b) is an organopolysiloxane having $R^1_3SiO_{0.5}$ and $SiO_2$ units and having a hydroxy group bonded to a silicon atom and/or an alkoxy group bonded to a silicon atom and having 1 to 6 carbon atoms. A molar ratio of the $R^1_3SiO_{0.5}$ units to the $SiO_2$ units in the organopolysiloxane is 0.5 to 1.5. $R^1$ is, independently of each other, a substituted or unsubstituted monovalent hydrocarbon group having 1 to 10 carbon atoms. A molar ratio of the $R^1_3SiO_{0.5}$ units to the $SiO_2$ units is preferably 0.6 to 1.3. If the molar ratio is less than 0.5 or is larger than 1.5, adhesiveness of an obtained silicone adhesive layer may be lower or a force to peel it from a release liner may be larger. The component (b) may be used singly or in a combination of two or more of them.

$R^1$ is a substituted or unsubstituted monovalent hydrocarbon group having 1 to 10 carbon atoms, preferably an alkyl group having 1 to 6 carbon atoms, a cycloalkyl group having 5 to 8 carbon atoms, an aryl group having 6 to 10 carbon atoms, an aralkyl group having 7 to 10 carbon atoms, and an alkenyl group having 2 to 8 carbon atoms. More specifically, examples of $R^1$ include alkyl groups such as a methyl, ethyl, propyl and butyl groups; cycloalkyl groups such as a cyclohexyl group; aryl groups such as a phenyl group and a tolyl group; aralkyl groups such as a benzyl group; and alkenyl groups such as a vinyl, allyl and hexenyl groups, and those in which a part or all of the hydrogen atoms bonded to a carbon atom are substituted with a hydroxy group, a cyano group, a halogen atom, an alkoxysilyl group, a polyoxyalkylene group, an epoxy group, or a carboxyl group. Among these, a methyl group and a phenyl group are preferable, and a methyl group is particularly preferable.

Component (b) may have an alkenyl group, but the amount of the alkenyl group is preferably small. For example, the amount of the alkenyl group is preferably 0.0001 to 0.2 mol, more preferably 0.0005 to 0.15 mol, and further preferably 0.001 to 0.10 mol, per 100 g of the organopolysiloxane. If the amount is larger than the upper limit, an obtained adhesive layer may be hard and an appropriate adhesive force may not be obtained. The amount of the alkenyl group is determined as described above.

Component (b) essentially have a $R^1{}_3SiO_{0.5}$ unit and a $SiO_2$ unit. As long as the effects of the present invention are not impaired, component (b) may have $R^1SiO_{1.5}$ units and/or $R^1{}_2SiO$ units, wherein $R^1$ is as described above. When component (b) has $R^1SiO_{1.5}$ units and/or $R^1{}_2SiO$ units, the total amount of the $R^1{}_3SiO_{0.5}$ units and $SiO_2$ units is not limited as long as the effects of the present invention are not impaired. The total amount is preferably 80 to 100 mol %, preferably 90 to 100 mol %, based on the total amount of the siloxane units in component (b).

Component (b) have a hydroxy group bonded to a silicon atom, i.e., SiOH group, and/or an alkoxy group having 1 to 6 carbon atoms and bonded to a silicon atom, i.e., alkoxysilyl group. Examples of the alkoxy group having 1 to 6 carbon atoms includes a methoxy group, an ethoxy group, a propoxy group, an isopropoxy group and a phenoxy group. When component (b) is a polysiloxane consisting of $R^1{}_3SiO_{0.5}$ and $SiO_2$ units, the hydroxy group and the alkoxy group are each bonded to the silicon atom of the $SiO_2$ units.

In component (b), the amount of the siloxane units having a SiOH group is preferably such that the amount of the hydroxy group is 0.1 to 5% by mass, preferably 0.2 to 4% by mass, based on the amount of component (b). If the amount of the hydroxy group is larger than 5 mass %, the adhesiveness of an obtained silicone adhesive layer may be lower or the curability may be lower. If the amount of the hydroxy group is less than 0.1 mass %, the condensation reaction between components (b) and components (a) and (b) dose not proceed sufficiently, so that the adhesive force may be lower. The amount of the siloxane unit having an alkoxysilyl group is preferably such that the amount of the alkoxy group is 10% by mass or less, preferably 8% by mass or less, based on the amount of component (b). If the amount of the alkoxy group is larger than 10 mass %, the adhesiveness of an obtained silicone adhesive layer may be lower or the curability may be lower. Further, it is preferable that the total amount of the siloxane unit having an SiOH group and the siloxane unit having an alkoxysilyl group is such that the total amount of the hydroxy group and the alkoxy group is 0.1 to 12 mass %, particularly 0.2 to 10 mass %, based on the amount of component (b). The siloxane unit having an SiOH group is, for instance, $R^1{}_2(OH)SiO_{0.5}$ unit, $R^1(OH)_2SiO_{0.5}$ unit, $R^1(OH)SiO$ unit, and $(OH)SiO_{1.5}$ unit. The siloxane unit having an alkoxysilyl group is, for instance, $R^1{}_2(OR')SiO_{0.5}$ unit, $R^1(OR')_2SiO_{0.5}$ unit, $R^1(OR')SiO$ unit and $(OR')SiO_{1.5}$ unit, wherein OR' is, independently of each other, an alkoxy group having 1 to 6 carbon atoms.

Component (b) preferably have a weight average molecular weight of 500 to 10,000, more preferably 1,000 to 8,000. The weight average molecular weight is determined by gel permeation chromatography (GPC) analysis with a developing solvent such as toluene and tetrahydrosilane (THF) and is reduced to polystyrene, hereinafter the same.

As described above, the silicone adhesive composition of the present invention is characterized in that in component (A), the mass ratio of components (a1)/(a2) is 100/0 to 45/55 and the amount of component (b) is 40 to 75 parts by mass, relative to total 100 part by mass of components (a1), (a2) and (b). The amount of component (b) is preferably 45 to 70 parts by mass, more preferably 45 to 65 parts by mass, relative to total 100 parts by mass of components (a1), (a2) and (b). If the amount of component (b) is larger than the aforesaid upper limit or smaller than the aforesaid lower limit, adhesiveness of an obtained silicone adhesive layer may be lower or a force to peel the layer from the peeling liner may be larger.

The mass ratio of (a1)/(a2) is 100/0 to 45/55, preferably 100/0 to 60/40, more preferably 100/0 to 70/30. Preferably, component (A) has a less or zero amount of an alkenyl group. Therefore, it is preferable that the content of component (a2) is also small, in particular, zero. When component (A) comprises component (a2), the lower limit of the aforesaid mass ratio is preferably 99/1. If the amount of component (a2) is too large, the crosslink density in a cured product of the silicone adhesive composition may be higher, so that the adhesion may be lower.

As described above, component (A) is a condensation product of components (a1), (b) and (a2), or a mixture of a condensation product of components (a1) with (b), and component (a2). The condensation product of components (a1), (b) and (a2) is obtained by a hydrolysis condensation reaction or a condensation reaction of the hydroxy group or alkoxy group of components (a1) and (a2) and the hydroxy group or alkoxy group of component (b). The mixture of the condensation product of components (a1) with (b), and component (a2) is obtained by mixing a hydrolysis condensation or condensation product of components (a1) with (b) and component (a2) having neither hydroxy group nor alkoxy group. Alternatively, component (a1), component (a2) having neither hydroxy group nor alkoxy group, and component (b) is placed in hydrolysis condensation reaction or condensation reaction conditions to obtain the aforesaid mixture. In particular, it is preferable that components (a1), (a2) and (b) are subjected to a condensation reaction in advance before being mixed with components (B) and (C). When the mass ratio of (a1)/(a2) is 100/0, that is, when component (A) does not contain component (a2), component (A) is a condensation reaction product of components (a1) and (b).

The condensation reaction may be carried out according to any conventionally known method, for example, in a solvent such as toluene. Components (a1), (a2) and (b) each dissolved in a solvent may be allowed react in the presence of an alkaline catalyst at room temperature, 25 degrees C., or with heating and reflux and, if necessary, neutralized. The reaction is preferably continued so that the amount of the hydroxy group of the SiOH group, i.e., the silanol group, remaining in the condensation reaction product is 0.02 to 4.1 mass %, particularly 0.05 to 3.5 mass %.

Examples of the alkaline catalyst for the condensation reaction include metal hydroxides such as lithium hydroxide, sodium hydroxide, potassium hydroxide and calcium hydroxide; carbonates such as sodium carbonate and potassium carbonate; bicarbonates such as sodium bicarbonate and potassium bicarbonate; metal alkoxides such as sodium methoxide and potassium butoxide; organometallics such as butyllithium; potassium silanolate; nitrogen compounds such as ammonia gas, ammonia water, methylamine, trimethylamine, and triethylamine. Ammonia gas and ammonia water are preferable.

The temperature of the condensation reaction is not particularly limited, and the reaction may be carried out at 10 to 150 degrees C. Generally, the condensation reaction may be carried out at a temperature of from room temperature, i.e. 25 degrees C., to a reflux temperature of the organic solvent. The reaction time may be 0.5 to 20 hours, preferably 1 to 16 hours, but is not particularly limited to these.

After completion of the reaction, a neutralizing agent for neutralizing the alkaline catalyst may be added. Examples of the neutralizing agent include acid gases such as hydrogen chloride and carbon dioxide; organic acids such as acetic acid, octylic acid and citric acid; and mineral acids such as hydrochloric acid, sulfuric acid and phosphoric acid. When ammonia gas, ammonia water or an amine compound having a low boiling point is used as the alkaline catalyst, those may be distilled off, while blowing an inert gas such as nitrogen gas.

The present invention is a silicone adhesive composition comprising the afore-mentioned component (A), an organohydrogenpolysiloxane (B) having three or more SiH groups in one molecule and an average degree of polymerization of 80 or less, and a platinum group metal catalyst (C).

Component (B)

Component (B) is an organohydrogenpolysiloxane having three or more SiH groups per molecule and an average degree of polymerization of 80 or less. The organohydrogenpolysiloxane may be single or a combination of two or more kinds of organohydrogenpolysiloxanes.

The SiH groups in component (B) are addition reacted with the alkenyl groups in component (a2) and, optionally, in component (b) to cure to thereby form a film. The SiH groups in component (B) react with each other, or the SiH groups in component (B) dehydrogenation condensated with the remaining SiOH group in component (A).

In the present invention, the amount of the alkenyl group in component (A) is restricted so as to reduce crosslinking caused by the addition reaction. As a result, a larger amount of diorganopolysiloxane is not incorporated in the cross-linked structure to remain in the present silicone adhesive composition, so that the wettability of the composition to an adherend is improved. Further, the SiH groups in component (B) having the specified average polymerization degree react with each other, or the SiH groups in component (B) dehydrogenation condensated with the remaining SiOH group in component (A) to thereby form slight cross-linking whereby, the strength of the cured film is improved. Furthermore, the remaining SiH group of component (B) interacts with the functional group present on the surface of the adherend. As a result, the cured product of the obtained silicone adhesive composition has high adhesion to the adherend independently of a peeling speed.

Component (B) is an organohydrogenpolysiloxane having 3 or more, preferably 3 to 80, more preferably 3 to 70, SiH groups per molecule. The organohydrogenpolysiloxane may be linear, branched or cyclic. The organohydrogenpolysiloxane preferably has a viscosity at 25 degrees C. of 1 to 2,000 mPa·s, more preferably 2 to 1,500 mPa·s. The viscosity is determined as described above.

The component (B) is characterized in that an average degree of polymerization is 80 or less, preferably 70 or less, more preferably 60 or less. If the average degree of polymerization is larger than the aforesaid upper limit, an adhesive force of a film may be lower or a peeling force from the release liner may be larger. The lower limit is not limited, but is preferably 2 or more, more preferably 4 or more.

The organohydrogenpolysiloxane may be represented, for example, by the following formula (5).

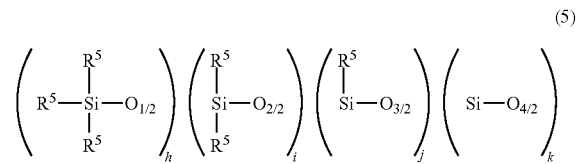

wherein $R^5$ is, independently of each other, a hydrogen atom or a substituted or unsubstituted monovalent hydrocarbon group having 1 to 10 carbon atoms and no aliphatic unsaturated bond, and at least three of $R^5$ are a hydrogen atom. h is an integer of 2 or more, i is an integer of 0 or more, j is an integer of 0 or more, and k is an integer of 0 or more, and $2<=h+i+j+k<=80$.

In the formula (5), h is an integer of 2 or more, preferably 2 to 50, i is an integer of 0 or more, preferably 0 to 78, j is an integer of 0 or more, preferably 0 to 50, k is an integer of 0 or more, preferably 0 to 50 and $2<=h+i+j+k<=80$, preferably $2<=h+i+j+k<=70$.

In the formula (5), $R^5$ is, independently of each other, a hydrogen atom or a substituted or unsubstituted monovalent hydrocarbon group having 1 to 10 carbon atoms and no aliphatic unsaturated bond. Examples of the monovalent hydrocarbon group for $R^5$ preferably includes an alkyl group having 1 to 6 carbon atoms, a cycloalkyl group having 5 to 8 carbon atoms, an aryl group having 6 to 10 carbon atoms, and an aralkyl group having 7 to 10 carbon atoms. Specific examples for $R^5$ are a hydrogen atom, an alkyl group such as a methyl group, an ethyl group, a propyl group and a butyl group, cycloalkyl groups such as a cyclohexyl group, aryl groups such as a phenyl group or a tolyl group, and aralkyl groups such as a benzyl group. Alternatively, a monovalent hydrocarbon group having 1 to 10 carbon atoms in which part or all of the hydrogen atoms bonded to the carbon atoms of these groups are substituted with a hydroxy group, a cyano group, a halogen atom, an alkoxysilyl group, a polyoxyalkylene group, an epoxy group or a carboxyl group may be included. Among these, a hydrogen atom, an alkyl group and an aryl group are preferable, and a hydrogen atom, a methyl group, an ethyl group, a propyl group and a phenyl group are more preferable.

When component (B) has an aryl group, the total number of the aryl group is preferably 3 to 40 mol %, more preferably 3 to 30 mol %, based on the total number of the hydrogen atom and the substituent each bonded to a silicon atom of the component (B). If the amount is larger than the aforesaid upper limit, the curability of the silicone adhesive layer obtained may be lower or its transparency may be lower. The aryl group is such bonded to a silicon atom and such of an aralkyl group bonded to a silicon atom. The aryl group of the aralkyl group bonded to a silicon atom is, for example, a phenyl group of a benzyl group (phenylmethyl group) and a phenyl group of a phenethyl group (phenylethyl group).

The present silicone adhesive composition contains the aforesaid amount of the aryl group, whereby the obtained adhesive layer is more incompatible with a release layer composed of a fluorine-containing silicone release composition described below. Therefore, the release layer may be easily peeled off from the adhesive layer and the peeling force rise less over time. When the adhesive layer is attached to an adherend, the SiH group of component (B) interacts with a functional group present on the adherend surface. In particular, when the adherend is a resin containing an aryl group, π electrons of the aromatic ring of the aryl group in component (B) interact with π electrons of the aromatic ring of the aryl group in the resin, so that adhesion is improved by the stacking effect.

The organohydrogenpolysiloxane (B) is preferably represented by the following formula (2).

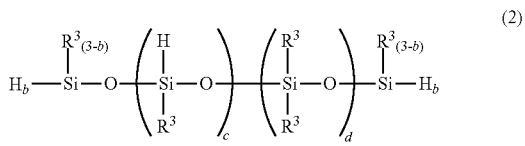

wherein $R^3$ is, independently of each other, a substituted or unsubstituted monovalent hydrocarbon group having 1 to 10 carbon atoms and no aliphatic unsaturated bond, b is 0 or 1, c is an integer of 1 or more, d is an integer of 0 or more, $2b+c \geq 3$, and $1 \leq c+d \leq 78$. The order of bonding of the siloxane units shown in the parentheses may be at random or such as to form a block structure.

Examples for $R^3$ include the monovalent hydrocarbon group as described for $R^5$. Among these, an alkyl group and an aryl group are preferable. A methyl group, an ethyl group, a propyl group and a phenyl group are more preferable.

In the formula (2), b is 0 or 1, c is an integer of 1 or more, preferably an integer of 1 to 70, d is an integer of 0 or more, preferably an integer of 0 to 70, and $2b+c \geq 3$, preferably $3 \leq 2b+c \leq 80$, and $1 \leq c+d \leq 78$, preferably $3 \leq c+d \leq 70$.

Component (B) is, for instance, represented by the following formula, but is not limited to these. In the following, Me is a methyl group and Ph is a phenyl group. The order of bonding of the siloxane units shown in the parentheses may be at random or such as to form a block structure.

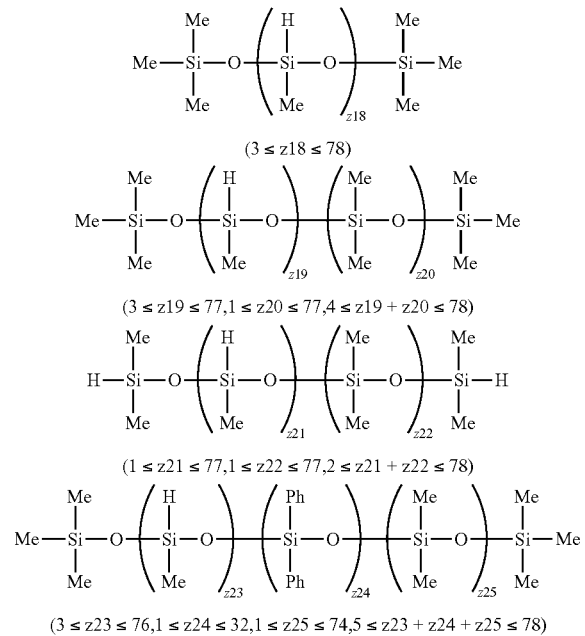

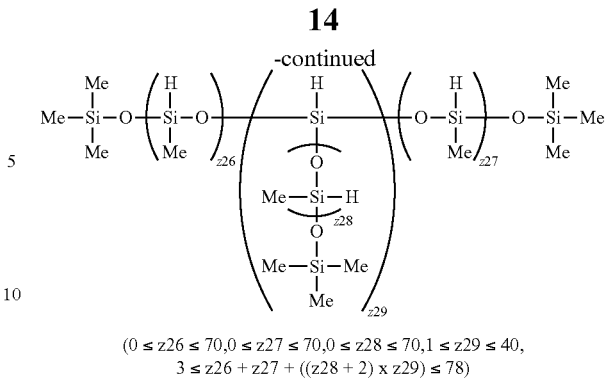

$(0 \leq z26 \leq 70, 0 \leq z27 \leq 70, 0 \leq z28 \leq 70, 1 \leq z29 \leq 40,$
$3 \leq z26 + z27 + ((z28 + 2) \times z29) \leq 78)$ In the silicone adhesive composition of the present invention, the amount of component (B) is 0.1 to 5 parts by mass, preferably 0.3 to 4 parts by mass, and more preferably 0.5 to 3 parts by mass, relative to 100 parts by mass of component (A). If the amount of component (B) is less than the aforesaid lower limit, the crosslink density of the cured product of the silicone adhesive composition is lower, so that the adhesive strength at a low speed is poor. If the amount is larger than the aforesaid upper limit, the crosslink density of the cured product of the silicone adhesive composition may be lower, so that the adhesive strength may be lower, or the time for a treatment liquid containing the adhesive composition to be useable may be shortened.

Component (C)

Component (C) is a platinum group metal catalyst and the promote the addition reaction of the component (a2) with (B), the dehydrogenation condensation of component (B) with each other, and the dehydrogenation condensation of the SiH group of component (B) with the remaining SiOH group of the component (A). The catalyst may be a known platinum group metal catalyst for promoting the aforesaid reactions. Examples of the catalyst include platinum-based catalysts such as chloroplatinic acid, an alcoholic solution of chloroplatinic acid, a reaction product of chloroplatinic acid with an alcohol, a reaction product of chloroplatinic acid with an olefin compound, and a reaction product of chloroplatinic acid with a siloxane having a vinyl group. A catalyst containing a metal such as ruthenium, rhodium, palladium or iridium may also be used. Among these, a platinum-based catalyst is preferable. The catalyst may be used singly or in combination of two or more of them.

The amount of component (C) may be a catalyst amount. The amount of catalyst is an amount effective to proceed with the aforesaid reactions. For instance, the amount of the catalyst is such that a mass of a platinum group metal is 1 to 5,000 ppm, preferably 5 to 500 ppm, particularly preferably 10 to 200 ppm, relative to a total mass of components (A) and (B). If the amount of the catalyst is less than the lower limit, the cross-linking density is lower, so that the adhesive force may be lower. If the amount of the catalyst is larger than the upper limit, the time for a treatment bath may be shorter.

Component (D)

The silicone adhesive composition of the present invention may further comprise, as an optional component, an agent to controll curing by the aforesaid addition reaction and condensation reaction. Component (D) functions to prevent a treatment liquid containing the adhesive composition from thickening or gelling prior to heat curing such as in the preparation of the adhesive composition or in application of the adhesive composition to a substrate. Any known reaction control agent may be used, for example, various organic nitrogen compounds, organophosphorus compounds, organosilicon compounds, acetylene compounds, oxime compounds and organochlorine compounds.

Examples of component (D) include acetylenic alcohols such as 3-methyl-1-butyn-3-ol, 3,5-dimethyl-1-hexin-3-ol, 3-methyl-1-pentene-3-ol, phenylbutynol and 1-ethynylcyclohexanol; acetylenic compound such as 3-methyl-3-1-pentene-1-in and 3,5-dimethyl-1-hexin-3-in; a reaction product of these acetylene-based compounds with an alkoxysilane or siloxane, or with a hydrogensilane; vinylsiloxanes such as a tetramethylvinylsiloxane cyclic compound; organic nitrogen compounds such as benzotriazole; and other organophosphorus compounds, oxime compounds and organic chromium compounds. The reaction control agent may be used singly or in a combination of two or more of them.

The amount of component (D) is 0 to 8 parts by mass, relative to total 100 parts by mass of components (A) and (B). When component (D) is imcorporated, a preferred amount is preferably 0.05 part by mass or more. More preferably, the amount is 0.1 to 5 parts by mass. If amount of the reaction control agent is larger than the aforesaid upper limit, the curability of the obtained composition may be lower.

Other Optional Components

The present silicone adhesive composition may comprise other optional components in addition to components (A) to (D). Examples of such include non-reactive organopolysiloxane such as polydimethylsiloxane and polydimethyldiphenyl siloxane; antioxidants such as phenolic, quinone, amine, phosphate, phosphite, sulfur, and thioether antioxidant; light stabilizers such as triazoles and benzophenones; flame retardants such as phosphate, halogen, phosphorus, and antimony; antistatic agents such as cationic, anionic, and nonionic activators; dyes; pigments; antifoaming agents; fillers; leveling agents; adhesion enhancers and thickeners; and solvents for lowering the viscosity at the time of coating, such as aromatic hydrocarbon solvents such as toluene and xylene; aliphatic hydrocarbon solvents such as hexane, heptane, octane, isooctane, decane, cyclohexane, methylcyclohexane and isoparaffin; hydrocarbon solvents such as industrial gasoline, petroleum benzine and solvent naphtha; ketonic solvents such as acetone, methyl ethyl ketone, 2-pentanone, 3-pentanone, 2-hexanone, 2-heptanone, 4-heptanone, methyl isobutyl ketone, diisobutyl ketone, acetonylacetone, and cyclohexanone; ester solvents such as ethyl acetate, propyl acetate, isopropyl acetate, butyl acetate and isobutyl acetate; ether solvents such as diethyl ether, dipropyl ether, diisopropyl ether, dibutyl ether, 1,2-dimethoxyethane, and 1,4-dioxane; solvents having ester and ether moieties such as 2-methoxyethyl acetate, 2-ethoxyethyl acetate, propylene glycol monomethyl ether acetate and 2-butoxyethyl acetate; siloxane-based solvents such as hexamethyldisiloxane, octamethyltrisiloxane, octamethylcyclotetrasiloxane, decamethylcyclopentasiloxane, tris(trimethylsiloxy)methylsilane and tetrakis(trimethylsiloxy)silane; and mixed solvents of these solvents. The solvent may be used singly or in a combination of two or more of them.

The silicone adhesive composition of the present invention may be prepared by mixing and dissolving components (A) to (C) and the optional component (D) and other optional components. The preparation manner is not limited. Preferably in view of the pot life, preferred method is such that components (A) and (B) and, if necessary, component (D) and other optional components are uniformly mixed in advance. And, then, component (C) is added to the mixture immediately before use.

The present silicone adhesive composition may be applied on various substrates and cured at given conditions to obtain a silicone adhesive layer. The silicone adhesive composition of the present invention may be suitably used to prepare, for example, an adhesive tape or sheet having a substrate wherein a cured layer composed of a cured product of the composition is laminated on at least one side of the substrate.

Examples of the substrate include paper, a plastic film, glass, metal and cloth. Examples of the paper include fine paper, coated paper, art paper, glassine paper, polyethylene laminated paper, kraft paper, Japanese paper and synthetic paper. Exampels of the plastic film include a polyethylene film, a polypropylene film, a polyester film, a polyimide film, a polyamide film, a polyvinyl chloride film, a polyvinylidene chloride film, a polyvinyl alcohol film, a polycarbonate film, a polytetrafluoroethylene film, a polystyrene film, an ethylene-vinyl acetate copolymer film, an ethylene-vinyl alcohol copolymer film, a triacetylcellulose film, a polyetheretherketone film and a polyphenylene sulfide film. Glass are not particularly limited and may be of any thickness or any type, such as chemically reinforced glass, and glass fibers neat or composite with a resin. Examples of the metal substrate include aluminum foil, copper foil, gold foil, silver foil and nickel foil.

A substrate may be subjected to primer treatment, corona treatment, etching treatment or plasma treatment in order to further improve the adhesiveness between the aforesaid substrates and the silicone adhesive layer.

The silicone adhesive composition may be applied on the substrate according to any known method, for example, by comma coaters, lip coaters, roll coaters, die coaters, knife coaters, blade coaters, rod coaters, bar coaters, kiss coaters, gravure coaters, screen coating, dip coating and cast coating.

The amount applied may be appropriately set depending on the application. Generally, the preferred amount is such that the thickness of the silicone adhesive layer after curred is 2 to 2,000 μm, particularly 3 to 1,000 μm.

The curing conditions of the silicone adhesive composition may be 10 seconds to 10 minutes at 70 to 250 degrees C., but are not limited to these.

The adhesive tape or sheet of the present invention may be prepared by directly applying the silicone adhesive composition of the present invention on the aforesaid substrate and curing the composition to form a silicone adhesive layer.

Alternatively, the composition may be applied on a release-coated film or paper and cured to form a silicone adhesive layer. Then, the silicone adhesive layer is attached to a substrate and transfer the silicone adhesive layer to the substrate.

The present invention further provides an adhesive sheet comprising a substrate, a first release layer on one side of the substrate, an adhesive layer on the first release layer, and a second release layer on the adhesive layer, i.e. laminate. Specifically, the first and the second release layers are each a cured product of a fluorine-containing silicone release composition, and the adhesive layer is a cured product of the aforesaid silicone adhesive composition. The present invention further provides a double-sided adhesive sheet comprising the cured product of the present silicone adhesive composition and having no substrate. The double-sided adhesive sheet having no substrate is obtained by removing the substrate and the release layers from the aforesaid adhesive sheet. The adhesive tape and sheet will be further explained below in detail.

The afore-mentioned laminate, an adhesive tape or sheet, is obtained by attaching a release layer such as a release liner to both surfaces of the adhesive layer of the cured product of the present silicone adhesive composition. The laminate may be in the form of a sheet or a roll of an elongated sheet.

For example, the present laminate is prepared by the following steps 1 through 3.

Step 1: the fluorine-containing silicone release composition is applied on one surface of each of two substrates and cured to form a first release layer and a second release layer.

Step 2: the silicone adhesive composition is applied on the first release layer obtained in Step 1 and cured to form an adhesive layer.

Step 3: the cured release composition on the second release layer obtained in Step 1 is put on the adhesive layer obtained in Step 2.

Another embodiment for the present method is a rolled laminate produced by the following steps 1 through 3.

Step 1: the fluorine-containing silicone release composition is applied on both sides of an elongated substrate and cured to form release layers (first release layer and second release layer) on both sides.

Step 2: the silicone adhesive composition is applied on the first release layer obtained in Step 1 and cured to form an adhesive layer.

Step 3: the substrate given the release layers and the cured composition is wound so that the second release layer is laid on the adhesive layer.

The fluorine-containing silicone release composition for the first release layer and the second release layer may be the same as or different from each other. Preferably, the fluorine-containing silicone release composition comprises the following components (E) through (G).

(E) a polydiorganosiloxane having at least two alkenyl groups each bonded to a silicon atom and at least one fluorine-containing organic group bonded to a silicon atom, wherein the number of the fluorine-containing organic group is at least 5% and less than 50% of a total number of group bonded to a silicon atom, (F) an polyorganosiloxane having at least three SiH groups in an amount such that a ratio of the number of the SiH group in component (F) to the number of the alkenyl group in component (E) is 0.5 to 10, and (G) a platinum group metal catalyst in a catalytic amount.

Components (E) to (G) will be explained in detail below.

Component (E) is an alkenyl group-containing polydiorganosiloxane having at least one fluorine-containing organic group in one molecule and having a fluorine-containing organic group bonded to a silicon atom. In component (E), the ratio of the total number of fluorine-containing organic group to the total number of groups each bonded to a silicon atom is 5% or more to less than 50%, preferably 8% to 45%, more preferably 10% to 40%. Even if the ratio is larger than the upper limit, no further improvement of the release property is obtained and, rather the curability may be lower, which is not preferable. If the ratio is less than the afore-mentioned lower limit, the release property from the silicone adhesive is lower.

Component (E) may be linear or branched. Component (E) is preferably a compound represented by the following general formula (6).

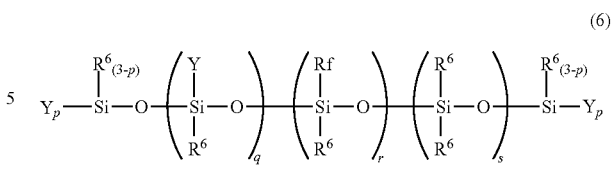

In formula (6), $R^6$ is, independently of each other, a substituted or unsubstituted, monovalent hydrocarbon group having 1 to 10 carbon atoms and no aliphatic unsaturated bond, Y is an alkenyl group or an alkenyl group-containing organic group, in which the alkenyl group has 2 to 10 carbon atoms, and Rf is a fluorine-containing organic group. The order of bonding of the siloxane units in the parentheses is not limited, and may be at random or such as to form a block structure.

Rf is, for example, represented by the following formulas (7) to (14).

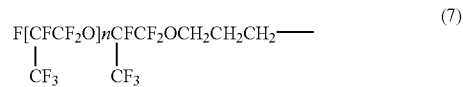

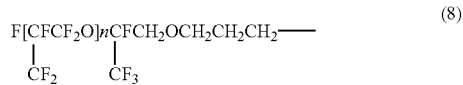

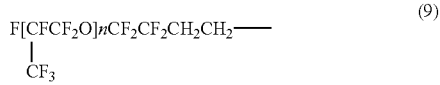

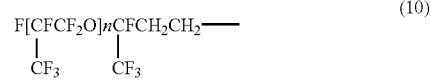

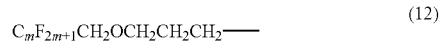

wherein m is an integer of 1 to 10 and n is an integer of 1 to

In the formula (6), Y is an alkenyl group or an alkenyl group-containing organic group, in which the alkenyl group has 2 to 10 carbon atoms, preferably an alkenyl group or a monovalent hydrocarbon group having an alkenyl group, in which the alkenyl group has 2 to 8 carbon atoms. The monovalent hydrocarbon group may contain an oxygen atom. Examples of the alkenyl group includes a vinyl group, an allyl group, a hexenyl group and an octenyl group. Examples of the monovalent hydrocarbon group having an alkenyl group include a cycloalkenylalkyl group such as cyclohexenylethyl group. Examples of the alkenyl group-containing monovalent hydrocarbon group which has an oxygen atom include (meth)acryloylalkyl groups such as an acryloylpropyl, acryloylmethyl and methacryloylpropyl group. They may also have an ether bond such as —(CH$_2$)$_2$—O—CH$_2$—CH=CH$_2$ and —(CH$_2$)$_3$—O—CH$_2$—CH=CH$_2$. Among these, a vinyl group, an allyl group, a hexenyl group, and octenyl group are preferable, and a vinyl group is more preferable.

$R^6$ is, independently of each other, a substituted or unsubstituted, monovalent hydrocarbon group having 1 to 10 carbon atoms and no aliphatic unsaturated bond. $R^6$ is preferably an alkyl group having 1 to 6 carbon atoms, a cycloalkyl group having 5 to 8 carbon atoms, an aryl group having 6 to 10 carbon atoms, and an aralkyl group having 7 to 10 carbon atoms. More preferably, $R^6$ is an alkyl group such as a methyl group, an ethyl group, a propyl group and a butyl group, a cycloalkyl group such as a cyclohexyl group, an aryl group such as a phenyl group and a tolyl group, an aralkyl group such as a benzyl group, and alkenyl group such as a vinyl group, an allyl group and a hexenyl group, and those in which a part or all of the hydrogen atoms each bonded to a carbon atom of aforesaid groups are substituted with a hydroxy group, a cyano group, a halogen atom, an alkoxysilyl group, a polyoxyalkylene group, an epoxy group, or a carboxyl group. Among these, an alkyl group and an aryl group are preferable, and a methyl group, an ethyl group and a propyl group are more preferable.

p in formula (6) is, independently of each other, an integer of 1 to 3. q is an integer of 0 or more, r is an integer of 1 or more, and s is an integer of 0 or more, provided that $30 \leq q+r+s \leq 2{,}000$, preferably $50 \leq q+r+s \leq 1{,}500$.

Component (E) is, for instance, ones represented by the following formulas, but is not limited to these. In the following formulas, Me is a methyl group and Vi is a vinyl group.

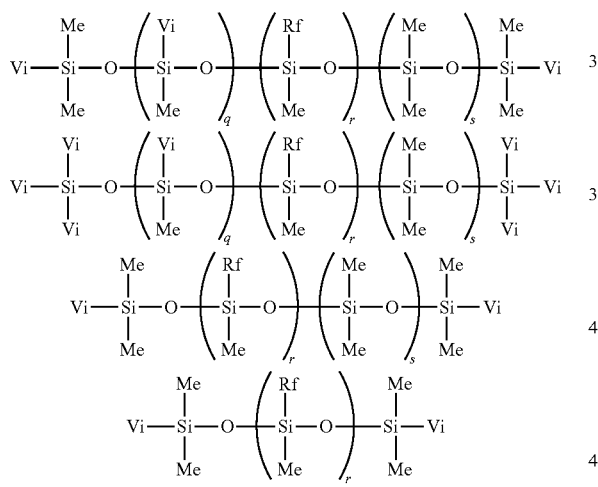

wherein Rf, q, r, and s are as defined above, and the order of the bonding of the siloxane units in the parentheses is not limited, and may be at random or such as to form a block structure.

Component (E) may be used singly or in combination of two or more of them.

Component (F) is an organohydrogenpolysiloxane having at least three SiH groups per molecule. Component (F) functions as a cross linking agent. The SiH in component (F) addition reacts with the alkenyl group in component (E) to form a cured film.

Component (F) preferably has a ratio of the total number of the fluorine-containing organic groups to the total number of the groups each bonded to a silicon atom of 0% or more and less than 40% in order to make compatibility with component (E) better. Component (F) may be linear, branched or cyclic. Component (F) may be single or in a combination of two or more of them.

For example, component (F) is preferably represented by the following general formula (15).

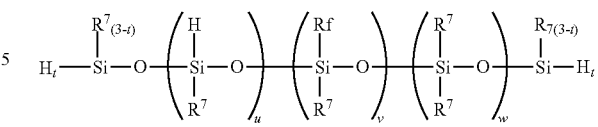

(15)

wherein $R^7$ is, independently of each other, selected from the groups defined for $R^6$ in formula (6), Rf is a group selected from the fluorine-containing organic groups defined in formula (6), t is, independently of each other, 0 or 1, u is an integer of 1 or more, v is an integer of 0 or more and w is an integer of 0 or more, provided that $3 \leq 2t+u$, $3 \leq u+v+w$, $u+v+w \leq 500$, preferably $5 \leq u+v+w \leq 300$. The order of the bonding of the siloxane units in the parentheses is not limited, and may be at random or such as to form a block structure.

Examples of component (F) include the following compounds, but are not limited to these.

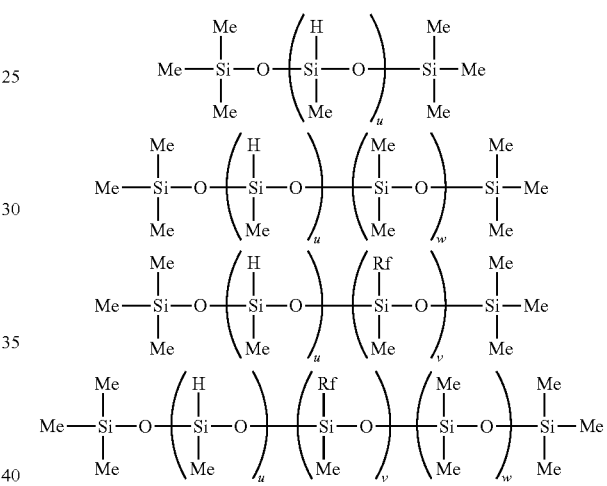

wherein Rf, u, v, and w are as described above, and the order of bonding of the siloxane units in the parentheses is not limited, and may be at random or such as to form a block structure.

The amount of component (F) is such that the ratio of the number of the SiH group in component (F) to the number of the alkenyl group in component (E) is 0.5 to 10, preferably 0.8 to 5. If the amount of component (F) is too small or too large, the curability of the silicone release composition may be lower or the properties of the cured product may be worse.

Component (G) is a platinum group metal catalyst to promote the addition reaction of components (E) with (F). Examples of component (G) include any known hydrosilyl reaction catalyst such as a catalyst based on platinum, palladium or rhodium. Among these, platinum-based catalyst is particularly preferable. For instance, a chloroplatinic acid, an alcohol solution of chloroplatinic acid, and complexes of chloroplatinic acid with various olefins or vinyl siloxanes may be used.

The amount of component (G) may be an effective amount as a catalyst and is not particularly limited. For instance, the amount of the catalyst is such that a mass of a platinum group metal is 1 to 1000 ppm, relative to a mass of component (E).

The silicone release composition may further comprise other components in addition to components (E) to (G) as long as the purposes and effects of the present invention are not impaired.

The other components include, for example, non-reactive polyorganosiloxanes such as polydimethylsiloxane, photopolymerization initiators, photo stabilizers, antioxidants, flame retardants, reactive diluents, leveling agents, thickeners, adhesion improvers, fillers, antistatic agents, antifoaming agents, dyes and pigments. For the purpose of controlling the activity of the addition reaction catalyst (G), an activity controlling agent such as various organic nitrogen compounds, organophosphorus compounds, organosilicon compounds, acetylene compounds, oxime compounds, organochlorine compounds may be incorporated. Among them, an acetylene compound such as 3-methyl-1-butyn-3-ol, a silylate of the acetylene compound, and silicon compounds such as divinylcyclotetrasiloxane are preferable. The amount of the activity controlling agent is generally 0.01 to 5 parts by mass, relative to 100 parts by mass of component (E).

The fluorine-containing silicone release composition is preferably dissolved in a solvent before used. This improves the application workability in applications of the release composition on the substrate. Examples of the solvent include aromatic hydrocarbon solvents such as toluene and xylene, and aliphatic hydrocarbon solvents such as hexane, heptane, octane, isooctane, decane, cyclohexane, methylcyclohexane and isoparaffin; hydrocarbon solvents such as industrial gasoline such as a volatilize oil for rubber, petroleum benzine and solvent naphtha; ketonic solvents such as acetone, methyl ethyl ketone, 2-pentanone, 3-pentanone, 2-hexanone, 2-heptanone, 4-heptanone, methyl isobutyl ketone, diisobutyl ketone, acetonylacetone and cyclohexanone; ester solvents such as ethyl acetate, propyl acetate, isopropyl acetate, butyl acetate and isobutyl acetate; ether solvents such as diethyl ether, dipropyl ether, diisopropyl ether, dibutyl ether, 1,2-dimethoxyethane and 1,4-dioxane; solvents having ester and ether moieties such as 2-methoxyethyl acetate, 2-ethoxyethyl acetate, propylene glycol monomethyl ether acetate and 2-butoxyethyl acetate; siloxane-based solvents such as hexamethyldisiloxane, octamethyltrisiloxane, octamethylcyclotetrasiloxane, decamethylcyclopentasiloxane, tris(trimethylsiloxy)methylsilane and tetrakis(trimethylsiloxy)silane; fluorinated solvents such as trifluorotoluene, hexafluoroxylene, methylnonafluorobutyl ether and ethylnonafluorobutyl ether, and a mixed solvent of these solvents. The solvent may be used singly or in combination of two or more of them.

The amount of the solvent is not particularly limited. A preferred amount is such that the viscosity of the solution of the silicone release composition is 100 mPa·s or less. Then, the applying workability of the solution of the fluorine-containing silicone release composition is improved, and the applied amount and the film thickness are easily controlled. For example, the amount of the solvent is preferably 25 to 100,000 parts by mass, more preferably 400 to 10,000 parts by mass, relative to total 100 parts by mass of components (E) and (F).

The present silicone release composition is preferably prepared by uniformly mixing components (E) and (F) and optional components in advance, and adding component (G) to the mixture immediately before use.

The fluorine-containing silicone release composition is applied on one or both sides of any one of various substrates and, then, cured at given conditions to provide a release layer on one or both sides of the substrate to form a release liner. A release liner having release layers on both sides is obtained by first applying and curing the release composition on one side of a substrate and, then, applying and curing the additional release composition in the other side.

Examples of the substrate include prepare a plastic film, glass, metal and cloth. Examples of the paper include fine paper, coated paper, art paper, glassine paper, polyethylene laminated paper, kraft paper, Japanese paper and synthetic paper. Exampels of the plastic film include a polyethylene film, a polypropylene film, a polyester film, a polyimide film, a polyamide film, a polyvinyl chloride film, a polyvinylidene chloride film, a polyvinyl alcohol film, a polycarbonate film, a polytetrafluoroethylene film, a polystyrene film, an ethylene-vinyl acetate copolymer film, an ethylene-vinyl alcohol copolymer film, a triacetylcellulose film, a polyetheretherketone film and a polyphenylene sulfide film. Glass are not particularly limited and may be any thickness or any type, such as chemically reinforced glass, and glass fibers neat or composite with a resin. Examples of the metal substrate include aluminum foil, copper foil, gold foil, silver foil and nickel foil.

A substrate may be subjected to primer treatment, corona treatment, etching treatment or plasma treatment in order to further improve the adhesiveness between the aforesaid substrates and the silicone adhesive layer.

The composition may be applied on the substrate according to any known method, for example, by comma coaters, lip coaters, roll coaters, die coaters, knife coaters, blade coaters, rod coaters, bar coaters, kiss coaters, gravure coaters, screen coating, dip coating and cast coating.

The amount applied may be appropriately set depending on the application. Generally, the preferred amount is such that the thickness of the release layer after cured is 0.03 to 5 μm, in particular 0.05 to 3.0 μm. The curing condition of the composition may be 30 seconds to 3 minutes at 100 to 180 degrees C., but not limited to these.

In the present adhesive tape or sheet, the release composition forming the release layer has the fluorine-containing group. In contrast, the silicone adhesive composition forming the adhesive layer does not have the fluorine-containing group, so that they are incompatible at the interface between the adhesive layer and the release layer. Therefore, the release layer may be easily peeled off from the adhesive layer and the increase of the peeling force over time is small.

The aforesaid adhesive tape or sheet is used as an adhesive sheet having no substrate by peeling off one release layer from the adhesive tape or sheet, adhering the adhesive layer surface to an object, then peeling off the other release layer from the adhesive tape or sheet and, then, adhering the another adhesive layer surface opposite to the adhesive layer surface to another object.

The present adhesive sheet having no substrate is advantageously used in miniaturized, thinned or lightened electronic devices and electrical appliances. For example, it is used for a cover glass and a touch panel of an electronic terminal such as a personal computer or a mobile phone, adhesion of a touch panel and a liquid crystal panel, a smart phone, a tablet terminal, a display of a car navigation system, a ticket vending machine, a chassis game machine, an ATM and an operation terminal of a instant photo-sticker, a remote controller of a karaoke machine and a cash register terminal.

EXAMPLES

The present invention will be explained below in further detail with reference to a series of the Examples and the Comparative Examples. However, the present invention is in no way limited by these Examples. In the following Examples and Comparative Examples, the order of bonding of the siloxane units shown in the parentheses is not limited, and may be at random or such as to form a block structure.

In the following, the viscosity was determined at 25 degrees C. by a BM-type rotary viscometer, and the term "part" refers to part by mass. Other properties were determined as will be explained below. In the Examples, Me is an abbreviation for a methyl group and Vi is an abbreviation for a vinyl group.

The term "part" means "part by mass", unless otherwise specified.

The components (a1), (a2), and (b) in the following Examples and Comparative Examples are as follows.

(a1) Dimethylpolysiloxane represented by the following formula (i) and having a viscosity of 70,000 mPa·s as a 30% by mass solution of a concentration of the dimethylpolysiloxane in toluene.

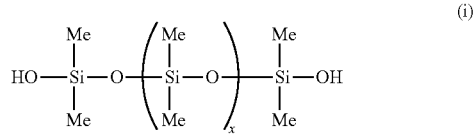

(i)

wherein x is the number such that the dimethylpolysiloxane has the aforesaid viscosity.

(a2) Dimethylpolysiloxane represented by the following formula (ii) and having a viscosity of 48,000 mPa·s as a 30% by mass solution of a concentration of the dimethylpolysiloxane in toluene, and having a vinyl group of 0.001 mol/100 g

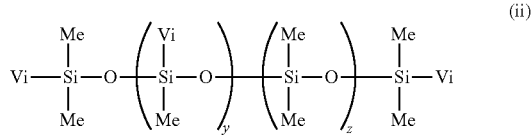

(ii)

wherein y and z are the numbers such that the dimethylpolysiloxane has the aforesaid viscosity and vinyl group content.

(b) Polysiloxane consisting of $Me_3SiO_{0.5}$ and $SiO_2$ units and having a hydroxy group bonded to a silicon atom of the $SiO_2$ units, wherein a molar ratio of the $Me_3SiO_{0.5}$ units to the $SiO_2$ units is 0.85, a content of the silicon atom-bonded hydroxy group is 2.2% by mass, and a weight-average molecular weight is 3,000.

<Preparation of Component (A)>

Synthesis Example 1

A solution was prepared by mixing 37.5 parts of the aforesaid dimethylpolysiloxane (a1), 12.5 parts of the aforesaid dimethylpolysiloxane (a2), 83.3 parts of 60 mass % solution of the polysiloxane (b) in toluene, 66.7 parts of toluene, and 0.5 part of ammonia water, and stirred at room temperature (25 degrees C., hereinafter the same) for 12 hours. Then, the solution was heated at about 110 to 125 degrees C. for 6 hours with refluxing to distill ammonia and water off. A product of a condensation reaction was obtained, whose solid matter had a content of the silicon atom-bonded hydroxy group of 0.66% by mass. The obtained condensation product was allowed to cool, then 0.2 part of ethynylcyclohexanol (D) was added thereto, and toluene was added thereto so that the amount of the solid content was about 50% by mass and mixed to obtain a base mixture A-1.

Synthesis Example 2

A solution was prepared by mixing 50.0 parts of the aforesaid dimethylpolysiloxane (a1), 83.3 parts of 60 mass % solution of the polysiloxane (b) in toluene, 66.7 parts of toluene, and 0.5 part of ammonia water, and stirred at room temperature for 12 hours. Then, the solution was heated at about 110 to 125 degrees C. for 6 hours with refluxing to distill ammonia and water off. A product of a condensation reaction was obtained, whose solid matter had a content of the silicon atom-bonded hydroxy group of 0.68% by mass. The obtained condensation product was allowed to cool, then 0.2 part of ethynylcyclohexanol (D) was added thereto, and toluene was added thereto so that the amount of the solid content was about 50% by mass and mixed to obtain a base mixture A-2.

Synthesis Example 3

A solution was prepared by mixing 30.0 parts of the aforesaid dimethylpolysiloxane (a1), 10.0 parts of the dimethylpolysiloxane (a2), 100.0 parts of 60 mass % solution of the polysiloxane (b) in toluene, 60.0 parts of toluene, and 0.5 part of ammonia water, and stirred at room temperature for 12 hours. Then, the solution was heated at about 110 to 125 degrees C. for 6 hours with refluxing to distill ammonia and water off. A product of a condensation reaction was obtained, whose solid matter had a content of the silicon atom-bonded hydroxy group of 0.92% by mass. The obtained condensation product was allowed to cool, then 0.2 part of ethynylcyclohexanol (D) was added thereto, and toluene was added thereto so that the amount of the solid content was about 50% by mass and mixed to obtain a base mixture A-3.

Synthesis Example 4

A solution was prepared by mixing 40.0 parts of the dimethylpolysiloxane (a1), 100.0 parts of 60 mass % solution of the polysiloxane (b) in toluene, 60.0 parts of toluene, and 0.5 part of ammonia water, and stirred at room temperature for 12 hours. Then, the solution was heated at about 110 to 125 degrees C. for 6 hours with refluxing to distill ammonia and water off. A product of a condensation reaction was obtained, whose solid matter had a content of the silicon atom-bonded hydroxy group of 0.93% by mass. The obtained condensation product was allowed to cool, then 0.2 part of ethynylcyclohexanol (D) was added thereto, and toluene was added thereto so that the amount of the solid content was about 50% by mass and mixed to obtain a base mixture A-4.

Comparative Synthesis Example 5

A solution of mixing 50.0 parts of the dimethylpolysiloxane (a2), 83.3 parts of a 60 mass % toluene solution of the polysiloxane (b), 66.7 parts of toluene, and 0.5 part of ammonia water was stirred at room temperature for 12 hours. Then, the mixture was heated at about 110 to 125 degrees C. for 6 hours with being refluxed, and ammonia and water were distilled off. In the obtained condensation product, the content of the silicon atom-bonded hydroxy group in the solid content was 0.64% by mass. The obtained condensation product was allowed to cool, then 0.2 part of ethynylcyclohexanol (D) was added thereto, and toluene was added thereto so that the amount of the solid content was about 50% by mass and mixed to obtain a base mixture A-5.

Comparative Synthesis Example 6

A solution was prepared by mixing 20.0 parts of the aforesaid dimethylpolysiloxane (a1), 30.0 parts of the aforesaid dimethylpolysiloxane (a2), 83.3 parts of 60 mass % solution of the polysiloxane (b) in toluene, 66.7 parts of toluene, and 0.5 part of ammonia water, and stirred at room temperature for 12 hours. Then, the solution was heated at about 110 to 125 degrees C. for 6 hours with refluxing to distill ammonia and water off. In the obtained condensation product, the content of the silicon atom-bonded hydroxy group in the solid content was 0.65% by mass. The obtained condensation product was allowed to cool, then 0.2 part of ethynylcyclohexanol (D) was added thereto, and toluene was added thereto so that the amount of the solid content was about 50% by mass and mixed to obtain a base mixture A-6.

Comparative Synthesis Example 7

A solution was prepared by mixing 40.0 parts of the aforesaid dimethylpolysiloxane (a2), 100.0 parts of 60 mass % solution of the polysiloxane (b) in toluene, 60.0 parts of toluene, and 0.5 part of ammonia water, and stirred at room temperature for 12 hours. Then, the solution was heated at about 110 to 125 degrees C. for 6 hours with refluxing, to distill ammonia and water off. In the obtained condensation product, the content of the silicon atom-bonded hydroxy group in the solid content was 0.91% by mass. The obtained condensation product was allowed to cool, then 0.2 part of ethynylcyclohexanol (D) was added thereto, and toluene was added thereto so that the amount of the solid content was about 50% by mass and mixed to obtain a base mixture A-7.

Examples 1-6 and Comparative Examples 1-6

Preparation of Silicone Adhesive Compositions

Components (B) and (C) corporated in the silicone adhesive compositions were as follows.
Component (B):
(B-1) Methylhydrogenpolysiloxane represented by the following formula:

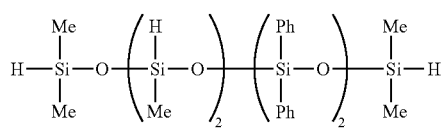

(B-2) Methylhydrogenpolysiloxane represented by the following formula:

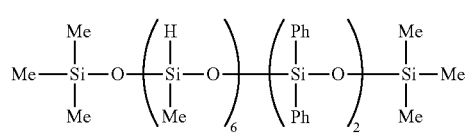

(B-3) Methylhydrogenpolysiloxane represented by the following formula:

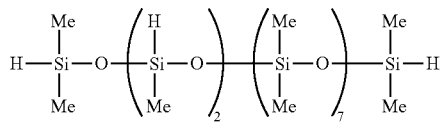

(B-4) Methyl hydrogenpolysiloxane represented by the following formula (for the Comparative Example):

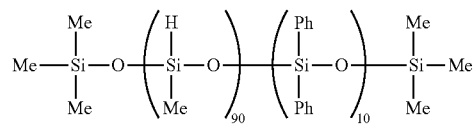

(B-5) Methyl hydrogenpolysiloxane represented by the following formula (for the Comparative Example):

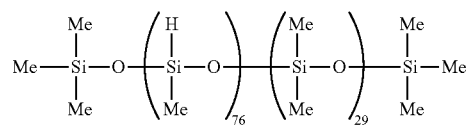

(C) Solution of 1,3-divinyl-1,1,3,3-tetramethyldisiloxane platinum(0) complex in toluene, containing 0.5% by mass of platinum.

Each of the base mixtures obtained in the Synthesis Examples or the Comparative Synthesis Examples and the aforesaid component (B) were placed in a flask in the amounts as described in the following Table 1 or 2, and dissolved by stirring. Component (C) was added to the resulting solution in an amount as described in Table 1 or 2, and mixed with stirring to obtain a silicone adhesive composition. An adhesive sheet was prepared with the silicone adhesive composition as will be described later, and a peeling force of a silicone release liner and an adhesion strength to a substance were determined.

Preparation of a Fluorine-Containing Silicone Release Composition

Components (E) and (F) incorporated in the silicone release compositions in the Examples and the Comparative Examples were as follows.

(E-1) Dimethylpolysiloxane represented by the following formula:

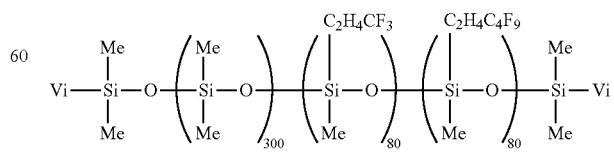

(E-2) Dimethylpolysiloxane represented by the following formula:

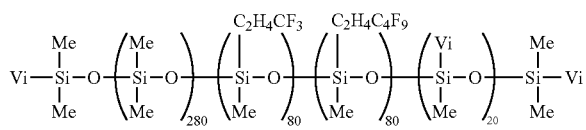

(F) Dimethylhydrogenpolysiloxane represented by the following formula:

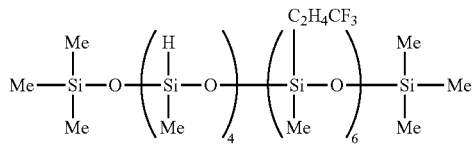

55.5 Parts by mass of the dimethylpolysiloxane (E-1), 45.5 parts by mass of the dimethylpolysiloxane (E-2), 12.6 parts by mass of the dimethylhydrogenpolysiloxane (F), 3 parts by mass of ethinylcyclohexanol, and 25 parts by mass of volatile oil for rubber were mixed. The number of Si—H groups in component (F) was 2.0 times the number of vinyl groups in component (E). 5.0 Parts by mass of (G) a solution of 1,3-divinyl-1,1,3,3-tetramethyldisiloxane platinum(0) complex in toluene, which contained 0.5% by mass of platinum, was added to the mixture. The mixture was diluted with a solution of hexane and methyl ethyl ketone in a mass ratio of 1:1 so as to a solid content of 12% by mass to thereby prepare a fluorine-containing silicone release composition.

<Preparation of a First Release Liner>

The fluorine-containing silicone release composition was applied on one side of a polyethylene terephthalate film substrate having a thickness of 50 μm by a wire bar in such an amount as to provide a thickness of 1.0 μm after cured. Then, the composition was heated at 140 degrees C. for 30 seconds to cure to thereby prepare a first release liner.

<Preparation of a Second Release Liner>

The fluorine-containing silicone release composition was applied on one side of a polyethylene terephthalate film substrate having a thickness of 50 μm in such an amount as to provide a thickness of 0.6 μm after cured with a wire bar. Then, the composition was heated at 140 degrees C. for 30 seconds to cure to thereby prepare a second release liner.

<Preparation of a Double-Sided Adhesive Sheet>

The silicone adhesive composition obtained in the Example or the Comparative Example was applied on the release-treated second release liner by an applicator in such on amount as to provide a thickness after curing was 50 μm and, then, heated at 130 degrees C. for 2 minutes to cure. Then, on this adhesive surface, the release-treated face of the first release liner was put to prepare a laminate. This laminate was pressed by one reciprocating motion of a 2-kg roller coated with a rubber layer, and aged at 25 degrees C. for 1 day to obtain a double-sided adhesive sheet.

Each adhesive sheet was subjected to the following evaluation tests. The results are shown in Tables 1 and 2.

<Peeling Force 1>

The first release liner was peeled from the adhesive sheet at a peeling rate of 0.3 m/min and a peeling angle of 180°, by a tensile testing machine to determine a peeling force in N/25 mm.

<Peeling Force 2>

The adhesive surface of the adhesive sheet after the afore-mentioned test for peeling force 1 was adhered to a polyethylene terephthalate film having a thickness of 50 μm. The second release liners was peeled from the adhesive sheet at a peeling rate of 0.3 m/min and a peeling angle of 180° by a tensile testing machine to determine a peeling force in N/25 mm.

<Adhesion Strength 1>

The adhesive layer surface of the afore-mentioned test for peeling force 2 was put on a glass plate, and pressed by one reciprocating motion of a 2-kg roller coated with a rubber layer and left at room temperature for about 2 hours. The polyethylene terephthalate film was peeled off from the adhesive layer surface at a peeling rate of 0.3 m/min and a peeling angle of 180° by a tensile testing machine to determine a peeling force in N/25 mm.

<Adhesion Strength 2>

The adhesive layer surface after the afore-mentioned test for peeling force 2 was put on a glass plate, and pressed by one reciprocating motion of a 2-kg roller coated with a rubber layer and left at room temperature for about 2 hours. The polyethylene terephthalate film was peeled off from the adhesive layer surface at a peeling rate of 0.05 m/min and a peeling angle of 180° by a tensile testing machine to determine a peeling force in N/25 mm.

TABLE 1

| | | Example | | | | | |
|---|---|---|---|---|---|---|---|
| | | 1 | 2 | 3 | 4 | 5 | 6 |
| Base mixture, parts by mass | | A-1 100 | A-2 100 | A-2 100 | A-2 100 | A-3 100 | A-4 100 |
| Molar ratio, (a1)/(a2)/(b) | | 37.5/ 12.5/ 50 | 50/0/ 50 | 50/0/ 50 | 50/0/ 50 | 30/10/ 60 | 40/0/ 60 |
| Molar ratio, (a1)/(a2) | | 75/25 | 100/0 | 100/0 | 100/0 | 75/25 | 100/0 |
| Component (B), parts by mass | (B-1) | 0.65 | 0.50 | | | 0.65 | 0.65 |
| | (B-2) | | | 0.50 | | | |
| | (B-3) | | | | 0.50 | | |
| Component(C), parts by mass | | 0.40 | 0.80 | 0.80 | 0.80 | 0.40 | 0.40 |
| Peeling force 1, N/25 mm | | 0.09 | 0.07 | 0.09 | 0.06 | 0.06 | 0.06 |
| Peeling force 2, N/25 mm | | 0.14 | 0.10 | 0.24 | 0.38 | 0.07 | 0.07 |
| Adhesion strength 1, N/25 mm peeling rate: 0.3 m/min | | 23.4 | 21.8 | 18.2 | 20.4 | 18.7 | 18.8 |
| Adhesion strength 2 (N/25 mm) peeling rate: 0.05 m/min | | 16.1 | 16.3 | 19.1 | 14.3 | 18.2 | 21.7 |

TABLE 2

| | | Comparative Example | | | | | |
|---|---|---|---|---|---|---|---|
| | | 1 | 2 | 3 | 4 | 5 | 6 |
| Base mixture, parts by mass | | A-5 100 | A-6 100 | A-2 100 | A-2 100 | A-2 100 | A-7 100 |
| Molar ratio, (a1)/(a2)/(b) | | 0/50/ 50 | 20/30/ 50 | 50/0/ 50 | 50/0/ 50 | 50/0/ 50 | 0/40/ 60 |
| Molar ratio, (a1)/(a2) | | 0/100 | 40/60 | 100/0 | 100/0 | 100/0 | 0/100 |
| Component (B), parts by mass | (B-1) | 0.65 | 0.65 | | | | 0.65 |
| | (B-4) | | | | 0.50 | | |
| | (B-5) | | | | | 0.5 | |
| Component(C), parts by mass | | 0.40 | 0.40 | 0.80 | 0.80 | 0.80 | 0.40 |

TABLE 2-continued

|  | Comparative Example | | | | | |
|---|---|---|---|---|---|---|
|  | 1 | 2 | 3 | 4 | 5 | 6 |
| Peeling force 1, N/25 mm | 0.09 | 0.11 | 0.05 | 0.16 | 0.38 | 0.07 |
| Peeling force 2, N/25 mm | 0.53 | 0.26 | 0.12 | 1.45 | 2.60 | 0.10 |
| Adhesion strength 1, N/25 mm peeling rate: 0.3 m/min | 13.5 | 14.8 | 20.6 | 11.2 | 9.7 | 17.7 |
| Adhesion strength 2 (N/25 mm) peeling rate: 0.05 m/min | 7.9 | 9.2 | 7.0 | 5.2 | 6.6 | 13.6 |

As shown in Table 1, the double-sided adhesive sheet composed of the cured product of the present silicone adhesive composition was peeled from the first and second release liners with the small forces. The adhesion strengths determined two different at a peeling rate of 0.03 m/min. and 0.05 m/min. were both high. That is, the present adhesive sheet has a high adhesion strength without being influenced by a peeling speed.

On the other hand, as shown in Table 2, the double-sided adhesive sheets composed of the cured product of the silicone adhesive composition containing the too much amounts of component (a2) showed the poor adhesion strength and the adhesion strengths varying, depending on the peeling speed (Comparative Examples 1, 2, and 6). The double-sided adhesive sheets composed of the cured product of the silicone adhesive composition containing methylhydrogenpolysiloxane having an average polymerization degree of more than 80 showed the larger peel force from the first and second release liners and the inferior adhesion force (Comparative Examples 4 and 5). In the double-sided adhesive sheet composed of the cured product of the silicone adhesive composition containing no component (B), the adhesive strength varied, depending upon the peeling rate (Comparative Example 3).

INDUSTRIAL APPLICABILITY

The cured product of the present silicone adhesive composition has a high adhesion strength, regardless of a peeling rate and adhere a substance strongly or fix a substance firmly. Further, the present cured product has excellent release properties to a release liner having a fluorine-containing silicone release composition and, therefore, provides an adhesive tape or adhesive sheet having excellent release properties and adhesion strength, and, further provides a double-sided adhesive sheet having no substrate. The present double-sided adhesive sheet is advantageously used, in particular, for miniaturized, thinned or lightened electronic devices and electrical appliances.

The invention claimed is:

1. A silicone adhesive composition consisting of the following components (A) to (D),
   (A) a condensation product of the following components (a1) and (b), wherein an amount of the component (b) is 75 to 40 parts by mass, relative to total 100 parts by mass of components (a1) and (b),
      (a1) a linear or branched diorganopolysiloxane having a silicon atom-bonded hydroxy group and/or a silicon atom-bonded alkoxy group having 1 to 10 carbon atoms at a terminal and having no alkenyl group,
      (b) an organopolysiloxane comprising an $R^1{}_3SiO_{0.5}$ unit and an $SiO_2$ unit and having a silicon atom-bonded hydroxy group and/or a silicon atom-bonded alkoxy group having 1 to 6 carbon atoms, wherein a molar ratio of the $R^1{}_3SiO_{0.5}$ unit to the $SiO_2$ unit is 0.5 to 1.5, wherein $R^1$ is, independently of each other, a substituted or unsubstituted monovalent hydrocarbon group having 1 to 10 carbon atoms, and at least one of $R^1$ may be an alkenyl group, but the amount of the alkenyl group is 0.0001 to 0.2 mol, per 100 g of the organopolysiloxane,
   (B) an organohydrogenpolysiloxane having at least three SiH groups and an average polymerization degree of 80 or less in an amount of 0.1 to 5 parts by mass, relative to 100 parts by mass of component (A),
   (C) a platinum group metal catalyst in a catalytic amount,
   (D) a reaction control agent in an amount of 0.05 to 8 parts by mass, relative to total 100 parts by mass of components (A) and (B), and
at least one optional components selected from the group consisting of non-reactive organopolysiloxanes, antioxidants, light stabilizers, flame retardants, antistatic agents, dyes, pigments, antifoaming agents, fillers, leveling agents, adhesion enhancers, thickeners and solvents.

2. The silicone adhesive composition according to claim 1, wherein component (a1) is represented by the following formula (1),

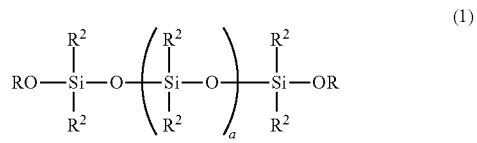

wherein R is, independently of each other, a hydrogen atom or a monovalent hydrocarbon group having 1 to 10 carbon atoms, $R^2$ is, independently of each other, a substituted or unsubstituted monovalent hydrocarbon group having 1 to 10 carbon atoms and no aliphatic unsaturated bond, and a is an integer of 100 to 20,000.

3. The silicone adhesive composition according to claim 1, wherein component (B) is represented by the following formula (2),

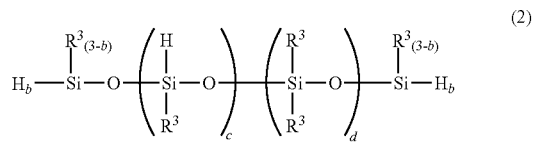

wherein $R^3$ is, independently of each other, a substituted or unsubstituted monovalent hydrocarbon group having 1 to 10 carbon atoms and no aliphatic unsaturated bond, b is 0 or 1, c is an integer of 1 or more, d is an integer of 0 or more, $2b+c \geq 3$, $1 \leq c+d \leq 78$, and the siloxane units shown in the parentheses may be at random or form a block structure.

4. The silicone adhesive composition according to claim 1, wherein component (B) has an aryl group having 6 to 10 carbon atoms or an aralkyl group comprising an aryl group and having 6 to 10 carbon atoms, and a total number of the aryl group constitutes 3 to 40% of a total number of the silicon atom-bonded hydrogen atom and the silicon atom-bonded substituent.

5. An adhesive tape comprising a substrate and a layer of a cured product of the silicone adhesive composition according to claim 1, wherein the layer is laminated on at least one side of the substrate.

6. An adhesive sheet comprising a substrate and a layer of a cured product of the silicone adhesive composition according to claim 1, wherein the layer is laminated on at least one side of the substrate.

7. An adhesive sheet or tape, comprising a substrate, a first release layer laminated on one side of the substrate, an adhesive layer laminated on the first release layer, and a second release layer laminated on the adhesive layer, wherein the first and the second release layers comprise, independently of each other, a cured product of a fluorine-containing silicone release composition and the adhesive layer comprises a cured product of the silicone adhesive composition according to claim 1.

8. A double-sided adhesive sheet comprising a cured product of the silicone adhesive composition according to claim 1 and having no substrate.

9. The adhesive sheet or tape according to claim 7, wherein the fluorine-containing silicone release composition comprises
(E) a polydiorganosiloxane having at least two alkenyl groups each bonded to a silicon atom and at least one fluorine-containing organic group bonded to a silicon atom, wherein the number of the fluorine-containing organic group is at least 5% and less than 50% of a total number of group bonded to a silicon atom,
(F) an polyorganosiloxane having at least three SiH groups in an amount such that a ratio of the number of the SiH group in component (F) to the number of the alkenyl group in component (E) is 0.5 to 10, and
(G) a platinum group metal catalyst in a catalytic amount.

10. The silicone adhesive composition according to claim 1, wherein $R^1$ is selected from the group consisting of an alkyl group having 1 to 6 carbon atoms, a cycloalkyl group having 5 to 8 carbon atoms, an aryl group having 6 to 10 carbon atoms, and an aralkyl group having 7 to 10 carbon atoms.

11. The silicone adhesive composition according to claim 1, wherein $R^1$ is a methyl group or a phenyl group.

12. The silicone adhesive composition according to claim 1, the solvent is selected from the group consisting of aromatic hydrocarbon solvents, aliphatic hydrocarbon solvents, hydrocarbon solvents, ketonic solvents, ester solvents, ether solvents, solvents having ester and ether moieties, and siloxane-based solvents; and mixed solvents of these solvents.

\* \* \* \* \*